Sept. 4, 1951   W. F. ERRIG ET AL   2,567,149
APPARATUS FOR INCISING TIRES
Filed Jan. 6, 1950   2 Sheets-Sheet 1

INVENTOR.
WILLIAM F. ERRIG
EDWARD S. DE HART
BY
ATTORNEY.

Sept. 4, 1951 W. F. ERRIG ET AL 2,567,149
APPARATUS FOR INCISING TIRES
Filed Jan. 6, 1950 2 Sheets-Sheet 2
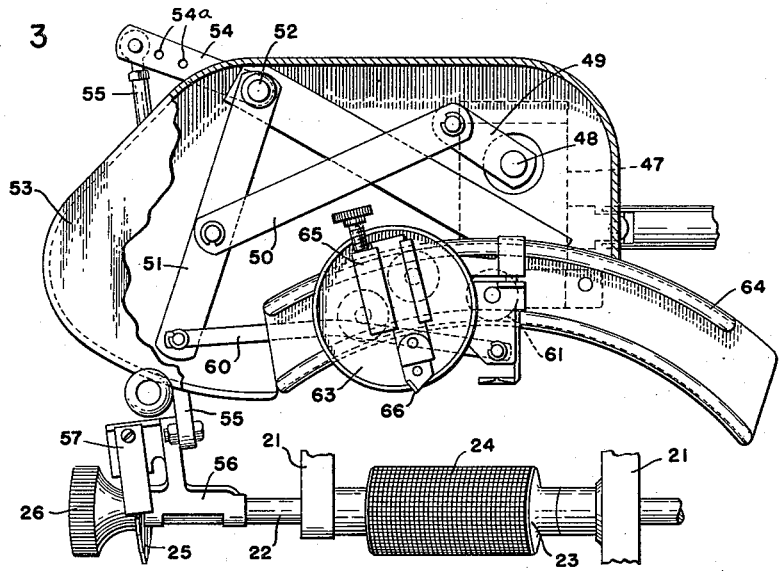
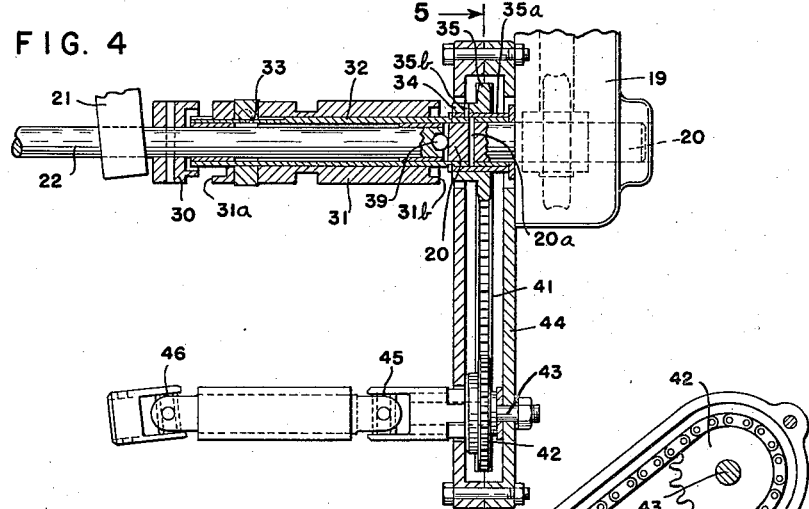
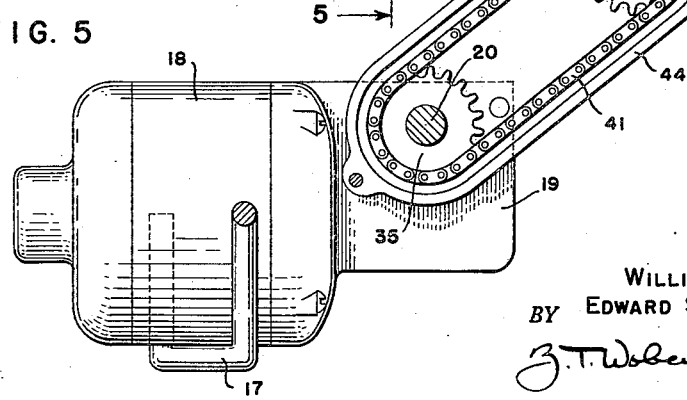
INVENTOR.
WILLIAM F. ERRIG
BY EDWARD S. DE HART
ATTORNEY.

Patented Sept. 4, 1951

2,567,149

UNITED STATES PATENT OFFICE 2,567,149

APPARATUS FOR INCISING TIRES

William F. Errig, Jenkintown, Pa., and Edward S. De Hart, Collingswood, N. J.; said De Hart assignor to said Errig Application January 6, 1950, Serial No. 137,104

7 Claims. (Cl. 164—73)

This invention relates to apparatus for incising tires and more particularly to apparatus for transversely cutting slots, slits, and the like in the tread of a pneumatic tire casing to increase the gripping action on the road surfaces on which the tire casing is used.

Apparatus for this general purpose has heretofore been proposed but this has usually been manually operated thus requiring the constant services of an operator.

In accordance with the present invention improved apparatus is provided for incising tires and with which, after initial setting, the desired grooves or slits may be cut, and the operation carried out without the necessity for applying any manual force or for constant attendance by the operator.

In accordance with the present invention, also, apparatus is provided, operated from a single motor, for advancing the tire step by step, in accordance with a predetermined indexing, and then making the desired incision transversely of the tread surface.

Other objects and advantageous features of the invention will be apparent from the specification and claims.

The nature and characteristic features of the invention will be more readily understood from the following description, taken in connection with the accompanying drawings forming part hereof, in which:

Fig. 3 is a view partly in elevation and partly in section illustrating the mechanism for transverse actuation of the cutter;

Fig. 4 is a fragmentary sectional view illustrating a portion of the driving mechanism; and Fig. 5 is a sectional view taken approximately on the line 5—5 of Fig. 4.

Figure 1:
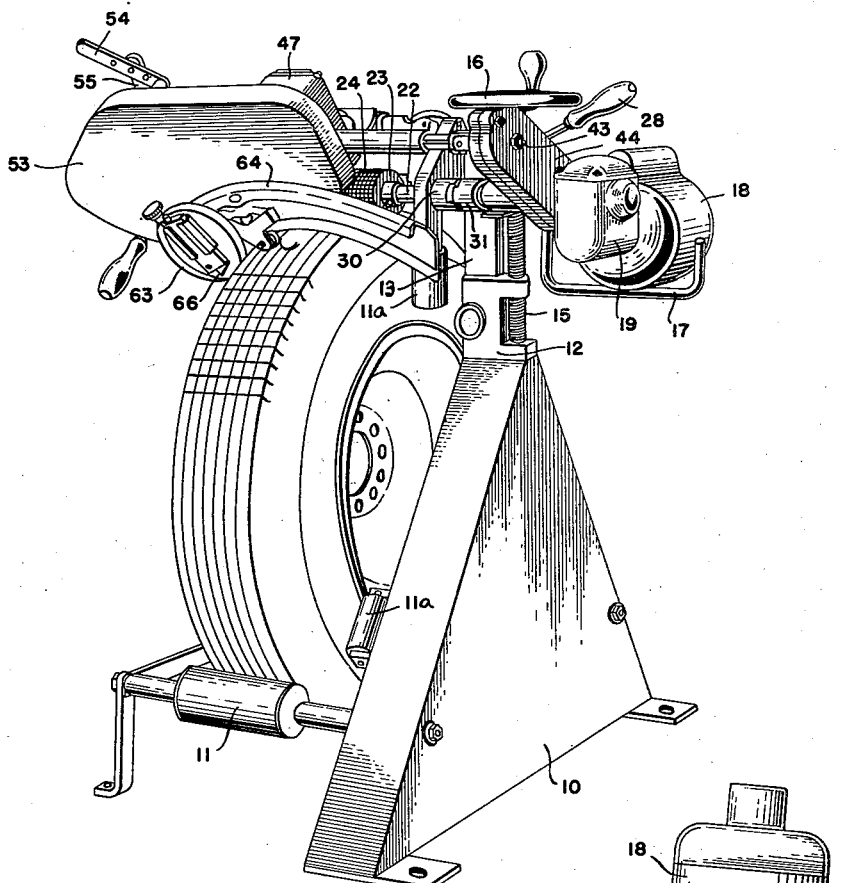
Figure 1 is a view in perspective of a machine embodying the main features of the present invention.
Figure 2:
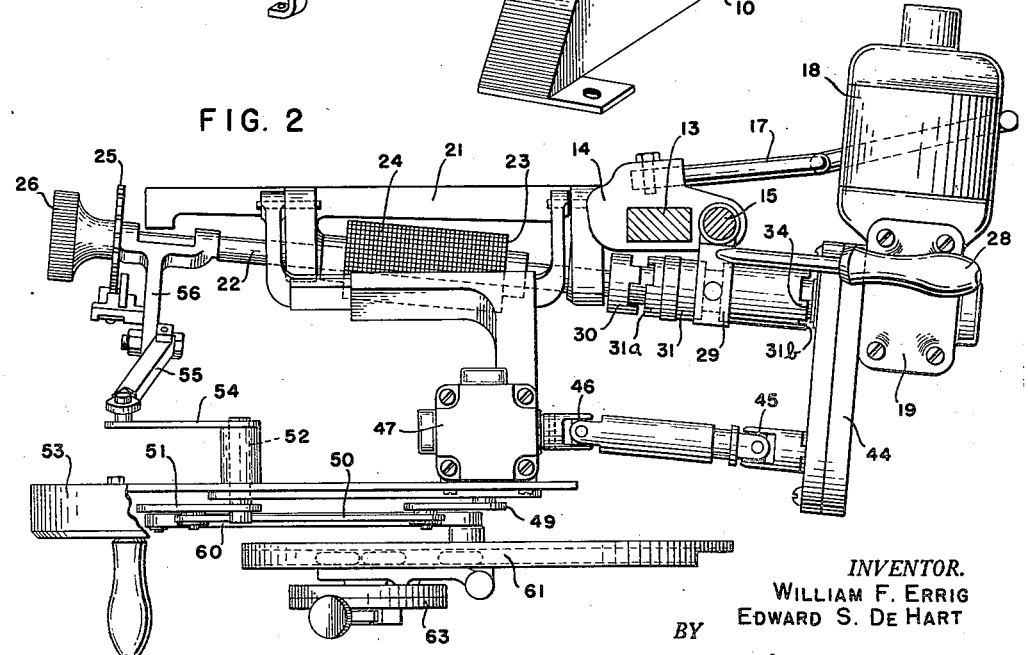
Fig. 2 is a top plan view, parts being omitted in the interest of clarity.

It should, of course be understood that the description and drawings herein are illustrative merely, and that various modifications and changes may be made in the structure disclosed without departing from the spirit of the invention.

Like numerals refer to like parts throughout the several views.

Referring now more particularly to the drawings, a base or frame is provided, which includes an upright stand 10 with tire supporting rollers 11 and guiding rollers 11a carried thereby. The stand is provided with an upright socket 12 in which a vertical post 13 is movable. The post 13 has a head 14 mounted thereon, the post 13 and head 14 being adapted to be raised or lowered by means of a screw 15 in engagement with the socket 12. A hand wheel 16 is provided for operating the screw 15.

The head 14 has, extending therefrom, a motor supporting bracket 17 for the reception of an electric motor 18. The motor 18 has a speed reducer 19 connected thereto, the speed reducer 19 having a take-off shaft 20 disposed perpendicularly with respect to the shaft (not shown) of the motor 18.

The head 14 has a frame 21 secured thereto, within which a shaft 22 is journaled, the shaft 22 being provided with a driving roller 23 having a peripheral surface 24 grooved or otherwise roughened for driving engagement with a tire or tire casing. The shaft 22 at the outer end thereof, is provided with an indexing ratchet wheel 25 for purposes to be explained, a hand wheel 26 being provided on the outer end of the shaft 22 for manual actuation if desired.

The shaft 22 has secured thereto a driven clutch element 30 for engagement, as desired, by the driving end face 31a of a driving clutch element 31. The clutch element 31 is slidably mounted on a hollow tubular shaft 32 and connected thereto by a spline 33. The end of the shaft 22 extends within the tubular shaft 32. The clutch element 31 is adapted to be positioned by a pivoted collar 29 which is provided with a handle 28 for manual movement.

The shaft 32 is connected by a key 20a to the shaft 20 and has a sleeve 35a rotatably carried thereon. A combined sprocket and driven clutch element 35 is mounted on and keyed by a key 35b to the sleeve 35a, and has an end clutch face 34 for engagement by a driving end face 31b of the clutch element 31. The end of the shaft 20 is separated by a ball 39 from the end of the shaft 21 to permit of free rotative movement. The sprocket 35 has a chain 41 thereon with which a sprocket 42 carried on a shaft 43 is also in engagement. The sprockets 35 and 42 and the chain 41 are preferably enclosed within the housing 44.

The shaft 43 is connected through universal joints 45 and 46 to a speed reducing gearing 47 having a take-off shaft 48. The take-off shaft 48 has secured thereto a crank arm 49 which is connected by a link 50 to a lever 51. The lever 51 is pivotally mounted on a pin 52, which is journaled in a housing 53 and extends outwardly therethrough, the pin 52 having a lever 54 connected to the outer end thereof for movement therewith.

The lever 54 is pivotally connected at a selected pivot hole 54a to an arm 55 which arm is in turn connected to a ratchet holder bracket 56 carried on the shaft 22. The ratchet holder bracket 56 has a ratchet finger 57 for engagement with the ratchet wheel 25 for turning the shaft 22 as hereinafter explained.

The lever 51 has an actuating arm 60 pivotally connected thereto which is pivotally connected to an actuator slide block 61. A cutter head 63 is secured to the slide block 61. The actuator slide block 61 is guided in an arcuate guide 64 which provides suitable curvature conforming to the approximate curvature of the transverse exterior surface of a tire casing.

The cutter head 63 is provided with a clamp 65 for adjustably securing therein a cutter blade 66, the cutter blade 66 being of any desired type in accordance with the character of incision to be made in the tire.

The mode of operation will now be pointed out.

When it is desired to apply a series of transverse incisions to a tire or tire casing, the clutch element 31 is shifted by the handle 28 to its intermediate or neutral position, so that its end faces 31a and 31b are free from engagement with the driven clutch element 30 and the clutch face 34. The motor 18 may then be energized and the shaft 20 will be actuated through the speed reducer 19.

In order to insert a tire casing, which is preferably mounted on a wheel with an air inflated interior tube, a vertical post 13 and head 14 are moved upwardly by turning the hand wheel 16, which permits of the positioning of a tire in engagement with the supporting rollers 11 and the guiding rollers 11a. The hand wheel is then turned to bring the driving roller 23 into engagement with the peripheral surface of the tire. The cutter blade 66 is then adjusted to give the desired depth of cut, the character of cut being determined by the type of cutter blade which is employed. With the clutch element 31 in neutral position neither the shaft 22 nor the shaft 43 will be rotated.

If it is desired to effect a transverse cutting operation on the tire casing, the clutch element 31 is shifted, by movement of the handle 28, to bring the clutch face 31b into engagement with the clutch face 35a. Rotation of the shaft 20 is effective through the shaft 32 and for rotating the sprocket 35, which, through the chain 41, rotates the sprocket 42 and the shaft 43. Rotation of the shaft 43 is effective, through the universal joints 45 and 46 and the speed reducer 47, for rotating the crank arm 49 and imparting movement through the link 50 to the lever 51. Movement of the lever 51 is effective, through the arm 60 and the actuator slide block 61, for moving the cutter head 63 and the cutter 66 carried thereby with an oscillatory movement in an arcuate path as determined by the guide 64. The linkage employed with the crank 49 provides rapid movement at the middle portion of the stroke of the cutter blade 66 when advancing towards the left (Fig. 3) for cutting, with a slow movement at each end of the stroke.

As the cutter blade 66 is moved, movement of the pin 52 is effective through the lever 54, the arm 55 and the ratchet holder bracket 56 for oscillating the ratchet finger 57. The ratchet finger 57, in engagement with the teeth of the ratchet wheel 25 is effective, upon movement in one direction for imparting movement of the shaft 22 through the desired angular extent in accordance with the spacing of the transverse cuts. The ratchet finger 57 slides over the teeth of the ratchet wheel 25 in the other direction of its oscillation.

The advancing movement of the ratchet wheel 25 is effected when the cutter blade 66 is out of cutting engagement with the tire casing. The length of the arm 55, and the different pivot locations provided in the lever 54, as well as the number and disposition of the teeth of the ratchet wheel 25, permit of determining the step by step advance of the tire casing by the driving roller 23, and accordingly of the distance between the respective incisions by the cutter blade 66.

If it is desired to effect a longitudinal cutting or other operation on the tire casing, the shaft 22 and driving roller 23 may be rotated without operating the transverse cutter blade 66 and the longitudinal cut made or other operation performed by suitable cutters or other tools (not shown). For this purpose the clutch element 31 is shifted, by moving the handle 28, to bring the clutch face 31a into engagement with the driven clutch element 30. The shaft 22 will then be driven from the shaft 20, through the shaft 32, the clutch element 31 and the clutch element 30. The continuous rotational movement of the tire casing may be terminated by moving the clutch element 31 to its neutral position.

It will be seen that with the apparatus of the present invention, a tire casing may quickly have applied to the tread portion thereof transverse incisions at predetermined circumferentially spaced intervals. When the desired transverse incisions have been applied, the clutch element 31 may be shifted to its neutral position, the hand wheel turned to raise the post 13 and the head 14, the tire which has been incised may be removed and another tire may be quickly and easily inserted.

We claim:

1. In apparatus for incising tires, a frame for supporting a tire for rotation, a head mounted on said frame, a driving roller carried by said head for engagement with the tire, a driving shaft for said roller, a driving motor carried by said head, a shaft driven by said motor, an intermittent driving connection for said roller shaft, members for operating said driving connection, and a shiftable operating member driven by said motor driven shaft for selective connection to said operating members and said roller shaft.

2. In apparatus for incising tires, a frame for supporting a tire for rotation, a vertically movable head carried by said frame, a driving roller carried by said head for engagement with the tire, a driving shaft for said roller, a driving motor carried by said head, a speed reducer connected to said motor, a shaft driven by said speed reducer, an intermittent driving connection for said roller shaft, members for operating said driving connection including a second speed reducer, and a shiftable operating member driven by said motor driven shaft for selective connection to said operating members and said roller shaft for selective operation of said roller shaft.

3. In apparatus for incising tires, means for supporting a tire for rotation, a transverse guide, an incising cutter movable along said guide, actuating means for said cutter, means including a ratchet wheel for rotatably advancing the tire through a predetermined angle, actuating means for said advancing means, a driving motor, and driving connections between said motor and said actuating means for simultaneous timed operation of said cutter and said tire rotating means.

4. In apparatus for incising tires, a frame for supporting a tire for rotation, a transverse arcuate guide, an incising cutter movable along said guide, an arm for oscillating said cutter, an actuating lever to which said arm is connected, an eccentrically connected member for oscillating said lever, means for advancing said tire through a predetermined angle, actuating means for said advancing means operated by said lever, and a motor connected to said eccentric member in driving relation.

5. An apparatus for incising tires, a frame for supporting a tire for rotation, a transverse arcuate guide, an incising cutter movable along said guide, an arm for oscillating said cutter, an actuating lever to which said arm is connected, a crank member for oscillating said lever, means for advancing said tire through a predetermined angle, actuating means for said advancing means operated by said lever, and a motor connected to said crank member in driving relation.

6. In apparatus for incising tires, a frame for supporting a tire for rotation, a head carried by said frame, a transverse arcuate guide mounted on said head, an incising cutter movable along said guide, members for oscillating said cutter including an eccentrically connected driving member, a driving roller for engagement with the tire for rotating the same, a shaft carried by said head on which said roller is mounted, a ratchet connection for intermittently advancing said shaft, actuating means for said ratchet connection including an actuating member connected to said cutter oscillating members, and a motor mounted on said head and connected to said eccentric member in driving relation.

7. In apparatus for incising tires, a frame for supporting a tire for rotation, a head carried by said frame, a transverse arcuate guide mounted on said head, an incising cutter movable along said guide, members for oscillating said cutter including an actuating lever to which said members are connected and a crank member for oscillating said lever, a driving roller for engagement with the tire for rotating the same, a shaft carried by said head on which said roller is mounted, a ratchet connection for intermittently advancing said shaft, actuating means for said ratchet connection including an actuating member connected to said lever, and a motor mounted on said head and connected to said crank member in driving relation.

WILLIAM F. ERRIG.
EDWARD S. DE HART.

REFERENCES CITED

The following references are of record in the file of this patent:

FOREIGN PATENTS

| Number | Country | Date |
|---|---|---|
| 785,948 | France | Aug. 22, 1935 |
| 463,421 | Great Britain | Mar. 30, 1937 |
| 483,017 | Great Britain | Apr. 11, 1938 |